(12) United States Patent
Xu et al.

(10) Patent No.: US 9,258,310 B2
(45) Date of Patent: Feb. 9, 2016

(54) METHOD AND DEVICE FOR PROCESSING AND TRACKING TACACS+ SESSION

(71) Applicant: ZTE CORPORATION, Shenzhen (CN)

(72) Inventors: De Xu, Shenzhen (CN); Jianye Chen, Shenzhen (CN)

(73) Assignee: ZTE CORPORATION (CN)

( * ) Notice: Subject to any disclaimer, the term of this patent is extended or adjusted under 35 U.S.C. 154(b) by 0 days.

(21) Appl. No.: 14/433,890

(22) PCT Filed: Aug. 30, 2013

(86) PCT No.: PCT/CN2013/082662
§ 371 (c)(1),
(2) Date: Apr. 7, 2015

(87) PCT Pub. No.: WO2014/056365
PCT Pub. Date: Apr. 17, 2014

(65) Prior Publication Data
US 2015/0256547 A1    Sep. 10, 2015

(30) Foreign Application Priority Data
Oct. 9, 2012 (CN) .......................... 2012 1 0379461

(51) Int. Cl.
*H04L 29/06*       (2006.01)
*H04L 12/64*       (2006.01)
(Continued)

(52) U.S. Cl.
CPC .......... *H04L 63/102* (2013.01); *H04L 12/6418* (2013.01); *H04L 43/08* (2013.01); *H04L 63/0892* (2013.01); *H04L 67/146* (2013.01)

(58) Field of Classification Search
CPC .... H04L 43/08; H04L 63/0892; H04L 67/146
See application file for complete search history.

(56) References Cited

U.S. PATENT DOCUMENTS 7,293,096 B1 * 11/2007 Foltak ................. H04L 63/0272
  709/227
7,895,311 B1 *  2/2011 Juenger .................. G06F 21/10
  709/223

(Continued)

FOREIGN PATENT DOCUMENTS

| CN | 102123147 A | 7/2011 |
| CN | 102668458 A | 9/2012 |
| CN | 102932245 A | 2/2013 |

OTHER PUBLICATIONS

Carrel, Dave. "TACACS+ Protocol Specification." (1997).*
(Continued)

*Primary Examiner* — Mohammad L Rahman
(74) *Attorney, Agent, or Firm* — Thomas Horstemeyer, LLP

(57) ABSTRACT

A method and device for processing and tracking a TACACS+ session, wherein, the method includes: registering an attribute value in a TACACS+ packet of a TACACS+ session to be tracked; when a TACACS+ client receives a TACACS+ request packet, analyzing the TACACS+ request packet to judge whether an attribute value in the TACACS+ request packet is the same as the registered attribute value or not; if the two are the same, saving the Session_id value in the TACACS+ request packet; when the TACACS+ client receives a TACACS+ response packet, comparing the Session_id value in the TACACS+ response packet with a saved Session_id value, and if the two Session_id values are the same, setting the status of the corresponding TACACS+ session as successful. The embodiments of the present document track the TACACS+ response packet, so as to implement the function of tracking the whole TACACS+ session that conforms to specific conditions.

10 Claims, 2 Drawing Sheets

(51) Int. Cl.
*H04L 29/08* (2006.01)
*H04L 12/26* (2006.01)

(56) References Cited

U.S. PATENT DOCUMENTS

2009/0109982 A1 4/2009 Batz et al.
2009/0300707 A1* 12/2009 Garimella ........... H04L 63/0823
 726/1
2011/0320555 A1* 12/2011 Qiu ........................ H04L 63/08
 709/207

OTHER PUBLICATIONS

International Search Report Dated Dec. 12, 2013.

* cited by examiner

METHOD AND DEVICE FOR PROCESSING AND TRACKING TACACS+ SESSION

CROSS-REFERENCE TO RELATED APPLICATIONS

This application is the 35 U.S.C. §371 national stage of PCT Application No. PCT/CN2013/082662, filed Aug. 30, 2013, which is herein incorporated by reference in its entirety and which also claims priority to, and the benefit of, Chinese Patent Application No. 201210379461.5, filed Oct. 9, 2012, which is herein incorporated by reference in its entirety.

TECHNICAL FIELD

The present document relates to the field of communications, and more particularly, to a method and device for processing and tracking a Terminal Access Controller Access Control System (TACACS+) session.

BACKGROUND OF THE INVENTION

The Terminal Access Controller Access Control System (TACACS+) is a network application protocol of Authentication, Authorization, Accounting (AAA) type, the TACACS+ supports separate authentication, authorization and accounting functions, and allows different TACACS+ security servers to work as authentication, authorization and accounting servers to achieve authentication, authorization, and accounting functions.

The functions such as access control and authentication, authorization are respectively implemented on the TACACS+ servers and the TACACS+ client device (see FIG. 1), when a user's log in or another behavior which needs to be authenticated and authorized fails, it needs to determine the cause of the failure, then it needs to track the packet of the TACACS+ session to help locate the problem. However, in actual commercial environments, a large amount of authentication, authorization, accounting TACACS+ packets exchange, tracking all the TACACS+ packets will affect the processing efficiency of the system, and artificially selecting the desired packets will cost a lot of time and energy, and is not conducive to quickly locate the problem. When a user needs to analyze a specific TACACS+ session, if the desired packet is filtered out by analyzing the content of the TACACS+ packet, the existing problem is that the response packet of the TACACS+ packet typically does not contain the required information (such as user account, IP address, port, user authority level and other information), therefore the response packet cannot be tracked, leading to that the TACACS+ session tracking result is not reliable.

SUMMARY

In order to solve the problem in the prior art that the TACACS+ packet tracking cannot be performed aiming at a specific TACACS+ session, the present document provides a method and device for processing and tracking a TACACS+ session.

On one hand, a method for processing and tracking a TACACS+ session in accordance with the present document comprises: registering an attribute value in a TACACS+ packet of a TACACS+ session to be tracked; when a TACACS+ client receives a TACACS+ request packet, analyzing the TACACS+ request packet to judge whether an attribute value in the TACACS+ request packet is the same as the registered attribute value or not, when the two are the same, saving a Session_id value in the TACACS+ request packet; and, when the TACACS+ client receives a TACACS+ response packet, comparing a Session_id value in the TACACS+ response packet with the saved Session_id value, and when the two are the same, setting a status of the corresponding TACACS+ session as successful.

Wherein the attribute value comprises user account information, IP address information and port information.

Preferably, if Session_id values in all the TACACS+ response packets received by the TACACS+ client are all different from the saved Session_id value, the status of the corresponding TACACS+ session is set as failed.

Preferably, if the attribute value in the TACACS+ request packet is different from the registered attribute value, the TACACS+ request packet is discarded.

Preferably, when the corresponding TACACS+ session ends, the saved Session_id value is deleted.

On the other hand, a device for processing and tracking a TACACS+ session in accordance with the present document comprises: a packet attribute value registering module, configured to: register an attribute value in a TACACS+ packet of a TACACS+ session to be tracked; a request packet analysis processing module, configured to: when a TACACS+ client receives a TACACS+ request packet, analyze the TACACS+ request packet to judge whether the attribute value in the TACACS+ request packet is the same as the registered attribute value or not, when the two are the same, save a Session_id value in the TACACS+ request packet; and a response packet comparison processing module, configured to: when the TACACS+ client receives a TACACS+ response packet, compare a Session_id value in the TACACS+ response packet with the saved Session_id value, when the two are the same, set a status of the corresponding TACACS+ session as successful.

Beneficial Effects:

In the embodiment of the present document, it is to register information of a specific user to be tracked in the TACACS+ client side, and when the content of the TACACS+ request packet conforms to the registered specific user information, it is to save its Session_id value, when receiving a TACACS+ response packet with the same Session_id value, it indicates that the TACACS+ session is successful, based on which the TACACS+ response packet will be tracked, thereby achieving the function of tracking the entire TACACS+ session which meets the specific conditions.

PREFERRED EMBODIMENTS OF THE INVENTION

Hereinafter, in conjunction with the accompanying drawings and the embodiments, the present document will be described in detail. It should be noted that, the specific embodiments described herein are only used to explain rather than limit the present document.

Figure 1:
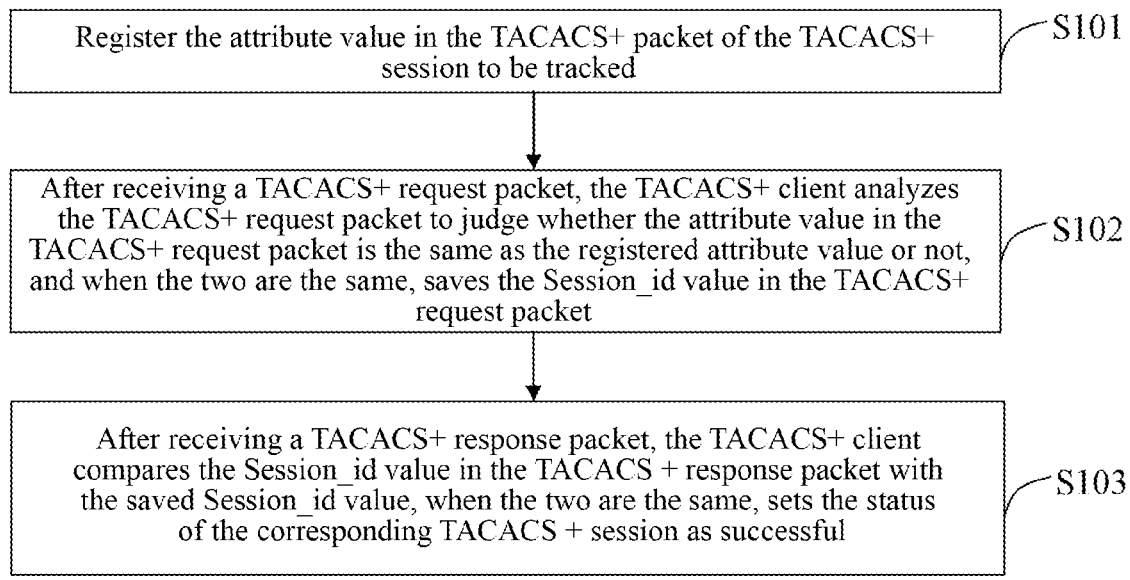
FIG. 1 is a flow chart of a method for processing and tracking a TACACS+ session in accordance with an embodiment of the present document.

FIG. 1 is a flow chart of a method for processing and tracking a TACACS+ session in accordance with the present document, which comprises following steps.

In S101, it is to register an attribute value in a TACACS+ packet of a TACACS+ session to be tracked;

In S102, after receiving a TACACS+ request packet, the TACACS+ client analyzes the TACACS+ request packet to judge whether the attribute value in the TACACS+ request packet is the same as the registered attribute value or not, and when the two are the same, saves the Session_id value in the TACACS+ request packet;

In S103, after receiving a TACACS+ response packet, the TACACS+ client compares the Session_id value in the TACACS+ response packet with the saved Session_id value, when the two are the same, sets the status of the corresponding TACACS+ session as successful.

The abovementioned steps are used for processing, it is to register the information, namely an attribute value (which can be a user account, port, IP address and other information) in the TACACS+ packet, of the specific user which needs to be tracked in the TACACS+ client side, when the content of the TACACS+ request packet conforms to the registered attribute value, the packet content is saved, and because the Session_id values in the TACACS+ packet headers are the same in the same TACACS+ session, the Session_id value in the request packet which satisfies the requirements is saved, when receiving a TACACS+ response packet, it is to compare the Session_id value in the response packet with the previously saved Session_id value, if the two are the same, it is a packet which is expected to be tracked, indicating that the TACACS+ session is successful. This method is used to successfully implement the tracking of the TACACS+ response packet, and achieve the function of tracking the entire TACACS+ session which meets specific conditions.

Figure 2:
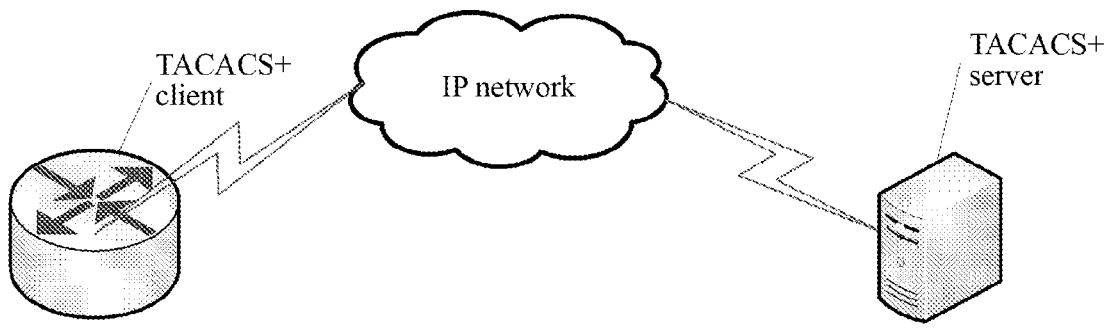
FIG. 2 is a schematic diagram of networking in accordance with an embodiment of the present document.

FIG. 2 is a schematic diagram of networking in accordance with an embodiment of the present document, the TACACS+ client device and the TACACS+ server are running on an IP network and exchange TACACS+ packets, the client device sends a TACACS+ request to the TACACS+ server, and the TACACS+ server responds to the TACACS+ request.

The following is a specific procedure of processing and tracking a specific TACACS+ session in accordance with an embodiment of the present document, and the procedure is as follows:

In S201, first, it is to register the user account (or information such as port and IP address) of the TACACS+ session which needs to be tracked in the TACACS+ client device.

In S202, the TACACS+ client device receives the TACACS+ packet and judges whether it is a request packet or not.

In S203, if it is a request packet, it is to analyze the TACACS+ request packet, and judge whether the user account in the request packet is the same as the previously registered user account or not; if the two are the same, save the Session_id value in the packet, and record the packet information; if the two are different, directly discard the TACACS+ request packet.

In S204, for a TACACS+ response packet received by the TACACS+ client device, it is to compare the Session_id value in the response packet with the previously saved Session_id value to judge whether there exists a same Session_id value or not; if there exists, record the TACACS+ response packet information, and set the status of the TACACS+ session as successful, and after the TACACS+ session ends, delete the saved Session_id value; if there does not exist, directly discard the TACACS+ response packet.

In S205, if a TACACS+ response packet whose Session_id value is the same as the saved Session_id value has not been received, it is to set the status of the TACACS+ session as failed, delete the saved Session_id value, turn back to S202, and perform the tracking process once again.

The above embodiment takes the user account of the client as the attribute value in the TACACS+ packet, and through the related processing of the TACACS+ request packet and the TACACS+ response packet, the tracking of the TACACS + session is realized, and the packet of the TACACS+ session can be accurately saved.

Figure 3:
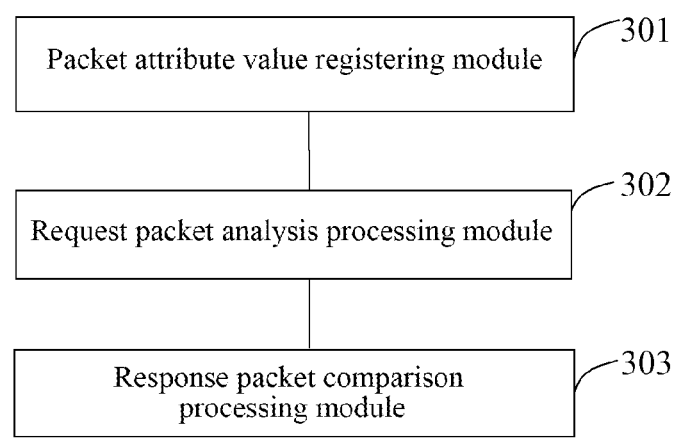
FIG. 3 is a schematic diagram of the structure of a device for processing and tracking a TACACS+ session in accordance with an embodiment of the present document.

On the other hand, in order to solve the problem in the prior art that the TACACS+ packet tracking cannot be carried out for a specific TACACS+ session, the present document further provides a device for processing and tracking a TACACS+ session, as shown in FIG. 3, comprising: a packet attribute value registering module 301, used to register the attribute value in the TACACS+ packet of the TACACS+ session to be tracked; a request packet analysis processing module 302, used to analyze the TACACS+ request packet to judge whether the attribute value in the TACACS+ request packet is the same as the registered attribute value or not when the TACACS+ client receives a TACACS+ request packet, if the two are the same, save the Session_id value in the TACACS+ request packet; and a response packet comparison processing module 303, used to compare the Session_id value in a TACACS + response packet with the saved Session_id value after the TACACS+ client receives the TACACS+ response packet, when the two are the same, set the status of the corresponding TACACS + session as successful.

Wherein, the response packet comparison processing module 303 acquires that the Session_id values in all the TACACS+ response packets received by the TACACS+ client are all different from the saved Session_id value, and sets the status of the corresponding TACACS+ session as failed.

Furthermore, the request packet analysis processing module 302 acquires that the attribute value in the TACACS+ request packet is different from the registered attribute value, discards the TACACS+ request packet.

Furthermore, after the corresponding TACACS + session ends, the response packet comparison processing module 303 deletes the saved Session_id value.

Although the preferred embodiments of the present document have been disclosed for illustrative purposes, a person skilled in the art will appreciate that various modifications, additions and substitutions are possible, and therefore the scope of the present document should not be limited to the abovementioned embodiments.

INDUSTRIAL APPLICABILITY

In the embodiment of the present document, it is to register information of a specific user to be tracked in the TACACS+ client side, and when the content of the TACACS+ request packet conforms to the registered specific user information, it is to save its Session_id value, when receiving a TACACS+ response packet with the same Session_id value, it indicates that the TACACS+ session is successful, based on which the TACACS+ response packet will be tracked, thereby achieving the function of tracking the entire TACACS+ session which meets the specific conditions.

What is claimed is:

1. A method for processing and tracking a terminal access controller access control system (TACACS+) session, comprising:

registering an attribute value in a TACACS+ packet of a TACACS+ session to be tracked;

when a TACACS+ client receives a TACACS+ request packet, analyzing the TACACS+ request packet to judge whether an attribute value in the TACACS+ request packet is the same as the registered attribute value or not, when the two are the same, saving a Session_id value in the TACACS+ request packet;

when the TACACS+ client receives a TACACS+ response packet, comparing a Session_id value in the TACACS+ response packet with the saved Session_id value, and when the two are the same, setting a status of the corresponding TACACS+ session as successful.

2. The method for processing and tracking a TACACS+ session of claim 1, wherein, the attribute value comprises user account information, IP address information and port information.

3. The method for processing and tracking a TACACS+ session of claim 1, wherein, if Session_id values in all TACACS+ response packets received by the TACACS+ client are all different from the saved Session_id value, the status of the corresponding TACACS+ session is set as failed.

4. The method for processing and tracking a TACACS+ session of claim 1, wherein, if the attribute value in the TACACS+ request packet is different from the registered attribute value, the TACACS+ request packet is discarded.

5. The method for processing and tracking a TACACS+ session of claim 1, wherein, when the corresponding TACACS+ session ends, the saved Session_id value is deleted.

6. A device for processing and tracking a TACACS+ session, comprising:

a packet attribute value registering module, configured to: register an attribute value in a TACACS+ packet of a TACACS+ session to be tracked;

a request packet analysis processing module, configured to: when a TACACS+ client receives a TACACS+ request packet, analyze the TACACS+ request packet to judge whether the attribute value in the TACACS+ request packet is the same as the registered attribute value or not, when the two are the same, save a Session_id value in the TACACS+ request packet; and a response packet comparison processing module, configured to: when the TACACS+ client receives a TACACS+ response packet, compare a Session_id value in the TACACS+ response packet with the saved Session_id value, when the two are the same, set a status of the corresponding TACACS+ session as successful.

7. The device for processing and tracking a TACACS+ session of claim 6, wherein, the attribute value comprises user account information, IP address information or port information.

8. The device for processing and tracking a TACACS+ session of claim 6, wherein, the response packet comparison processing module is configured to: acquire that the Session_id values in all the TACACS+ response packets received by the TACACS+ client are all different from the saved Session_id value, and set the status of the corresponding TACACS+ session as failed.

9. The device for processing and tracking a TACACS+ session of claim 6, wherein, the request packet analysis processing module is configured to: acquire that the attribute value in the TACACS+ request packet is different from the registered attribute value, discard the TACACS+ request packet.

10. The device for processing and tracking a TACACS+ session of claim 6, wherein, the response packet comparison processing module is configured to: after the corresponding TACACS + session ends, delete the saved Session_id value.

* * * * *